US012643621B1

(12) United States Patent
Popmarkov et al.

(10) Patent No.: US 12,643,621 B1
(45) Date of Patent: Jun. 2, 2026

(54) PRODUCTION STEERING COLUMN POSITIONING FIXTURE

(71) Applicant: GM Global Technology Operations LLC, Detroit, MI (US)

(72) Inventors: Steve Popmarkov, Detroit, MI (US); Alex Zoccatelli, Troy, MI (US); Brian Birrell, Macomb, MI (US); Nathaniel P. Jalbert, Macomb, MI (US); Mark Stephen Modena, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/066,802

(22) Filed: Feb. 28, 2025

(51) Int. Cl.
B62D 1/16 (2006.01)
B62D 65/00 (2006.01)

(52) U.S. Cl.
CPC .............. B62D 65/005 (2013.01); *B62D 1/16* (2013.01)

(58) Field of Classification Search
CPC ................................. B62D 65/005; B62D 1/16
USPC .................................................... 74/492, 493
See application file for complete search history.

(56) References Cited

U.S. PATENT DOCUMENTS

| | | | | |
|---|---|---|---|---|
| 3,798,994 A | * | 3/1974 | Hollins | B62D 1/11 |
| | | | | 180/90 |
| 3,921,747 A | * | 11/1975 | Suzuki | B62D 1/195 |
| | | | | 74/492 |
| 4,297,911 A | * | 11/1981 | Grahn | B62D 1/195 |
| | | | | 188/371 |
| 9,120,454 B2 | * | 9/2015 | Gorman | B60R 21/205 |
| 9,233,415 B2 | * | 1/2016 | Nakano | B21D 53/88 |
| 9,440,670 B2 | * | 9/2016 | Nakane | B62D 25/145 |
| 9,469,329 B1 | * | 10/2016 | Leanza | B60K 35/60 |
| 2016/0214650 A1 | * | 7/2016 | Ideguchi | B62D 1/16 |
| 2016/0362142 A1 | * | 12/2016 | Muneyasu | B62D 1/16 |
| 2018/0244299 A1 | * | 8/2018 | Mcwilliams | B62D 1/16 |
| 2019/0016395 A1 | * | 1/2019 | Kajikawa | B62D 25/145 |
| 2020/0094883 A1 | * | 3/2020 | Mitsuo | B62D 1/16 |

FOREIGN PATENT DOCUMENTS

| | | |
|---|---|---|
| CN | 112249196 A | 1/2021 |
| CN | 114162236 A | 3/2022 |

* cited by examiner

*Primary Examiner* — Toan C To
(74) *Attorney, Agent, or Firm* — Vivacqua Crane, PLLC

(57) ABSTRACT

A production steering column fixture includes a production steering column, a steering wheel, and a shroud. A steering component frame receives the production steering column, the steering wheel and the shroud in a predetermined design car position of a vehicle. An instrument panel is positioned proximate to the steering component frame. An occupant confirms visibility of the instrument panel at any position of the steering wheel.

18 Claims, 6 Drawing Sheets

PRODUCTION STEERING COLUMN POSITIONING FIXTURE

INTRODUCTION

The present disclosure relates to fixtures used for vehicle testing and verification including vehicle steering systems and instrument panels.

During vehicle development, features including instrument panels, vehicle seating positioning and vehicle steering systems are tested to confirm that line-of-sight to instruments and accessibility for operator control and adjustment requirements are met. Test fixtures may be used to hold components in place to perform verification testing. Such systems and components are commonly modeled in clay material to allow working modifications to be made when line-of-sight to instruments and accessibility for operator control and adjustment requirements are not met. Clay modelers therefore require access to the system components and for modeling equipment.

Thus, while current systems and methods to provide achieve their intended purpose, there is a need for a new and improved system and method to use a test fixture to hold components in place to perform vehicle verification testing.

SUMMARY

According to several aspects, a production steering column fixture includes a production steering column, a steering wheel, and a shroud. A steering component frame receives the production steering column, the steering wheel and the shroud in a predetermined design car position of a vehicle. An instrument panel is positioned proximate to the steering component frame. An occupant confirms visibility of the instrument panel at any position of the steering wheel.

In another aspect of the present disclosure, a fixture frame defines a metal including aluminum and further defining an aluminum fixture system receiving the steering component frame, the production steering column, the steering wheel and the shroud.

In another aspect of the present disclosure, a 3D printed steering column mount is provided. A first mounting surface of the steering component frame and an opposed second mounting surface of the steering component frame are mated to opposed inside facing first and second surfaces of steering column mount.

In another aspect of the present disclosure, multiple through apertures are created in the 3D printed steering column mount and are individually axially aligned with individual ones of multiple apertures of the steering component frame. A first bolt and a second bolt extend through aligned ones of the multiple through apertures created in the 3D printed steering column mount and the multiple apertures of the steering component frame to releasably mount the production steering column fixture to the steering component frame.

In another aspect of the present disclosure, a first linear rail and a second linear rail are connected to the steering component frame. A first rail channel and a second rail channel are connected to the fixture frame. The steering component frame slides parallel to a center line axis of the steering column in a linear motion controlled by sliding capture of the first linear rail within the first rail channel and the second linear rail within the second rail channel.

In another aspect of the present disclosure, at least one biasing member is attached to a frame of the 3D printed steering column mount and is oppositely connected to a tab extending from the steering component frame.

In another aspect of the present disclosure, the at least one biasing member includes: a first biasing member attached to a first frame member of the 3D printed steering column mount with a first metal mount and oppositely connected to a first tab extending from the steering component frame; and a second biasing member attached to a second frame member of the 3D printed steering column mount with a second metal mount and oppositely connected to a second tab extending from the steering component frame.

In another aspect of the present disclosure, the instrument panel defines a clay material adapted for on-site milling to modify the instrument panel.

In another aspect of the present disclosure, the steering wheel and the shroud individually define a 3D printed component.

In another aspect of the present disclosure, a keyway is created in the steering column. A key is connected to a structural member of the shroud, the key slidably received in the keyway to provide a predetermined design position and clocking of the shroud.

According to several aspects, a production steering column fixture includes a production steering column of a vehicle. A steering component frame receive the production steering column in individual ones of a predetermined test position and a stored position. A vehicle seat is movably connected to the steering component frame. A clay material instrument panel is positioned proximate to the steering component frame, wherein an occupant seated on the vehicle seat confirms visibility of the instrument panel at different displaced positions of the vehicle seat.

In another aspect of the present disclosure, a linear rail is connected to the steering component frame. A rail channel is connected to the fixture frame. The steering component frame slides parallel to a center line axis of the steering column in a linear motion controlled by sliding capture of the linear rail within the rail channel.

In another aspect of the present disclosure, a pull handle defining an aperture is created in a plate connected to the rail channel used to manually retract the steering component frame into the fixture frame.

In another aspect of the present disclosure, a biasing member is attached to a frame of a 3D printed steering column mount connected to the fixture frame, the biasing member controlling a rate of descent of the production steering column during displacement between an extended test position of the production steering column to a stored position having the production steering column retracted into the steering component frame.

In another aspect of the present disclosure, multiple through apertures are created in the 3D printed steering column mount individually axially aligned with individual ones of multiple apertures of the steering component frame.

In another aspect of the present disclosure, at least one bolt is extended through aligned ones of the multiple through apertures created in the 3D printed steering column mount and the multiple apertures of the steering component frame to releasably mount the production steering column fixture to the steering component frame.

In another aspect of the present disclosure, a steering wheel is connected to the production steering column. The occupant seated on the vehicle seat further confirms visibility of the instrument panel at different displaced positions of the steering wheel. A shroud is also connected to the production steering column.

According to several aspects, a method for using a production steering column fixture includes: assembling a production steering column, a steering wheel, and a shroud in a test position of a production assembly of a vehicle; mounting the production assembly on a steering component frame having a 3D printed steering column mount; individually axially aligning multiple through apertures created in the 3D printed steering column mount with individual ones of multiple apertures of a steering component frame; and extending a first bolt and a second bolt through the individually axially aligned multiple through apertures and the individual ones of the multiple apertures of the steering component frame; connecting the steering component frame to a fixture frame defining an aluminum fixture system; positioning an instrument panel of a clay material mimicking a production vehicle instrument panel proximate to the steering component frame; and confirming visibility of the clay instrument panel at any displaced position of the steering wheel.

In another aspect of the present disclosure, the method further includes: removing the first bolt and the second bolt; and moving the production assembly from the test position to a stored position.

In another aspect of the present disclosure, the method further includes machining the instrument panel in the stored position to modify the instrument panel.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
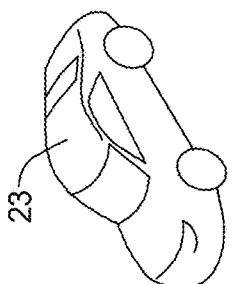
FIG. 1 is a side elevational view of a production steering column fixture according to an exemplary aspect.
Figure 1:
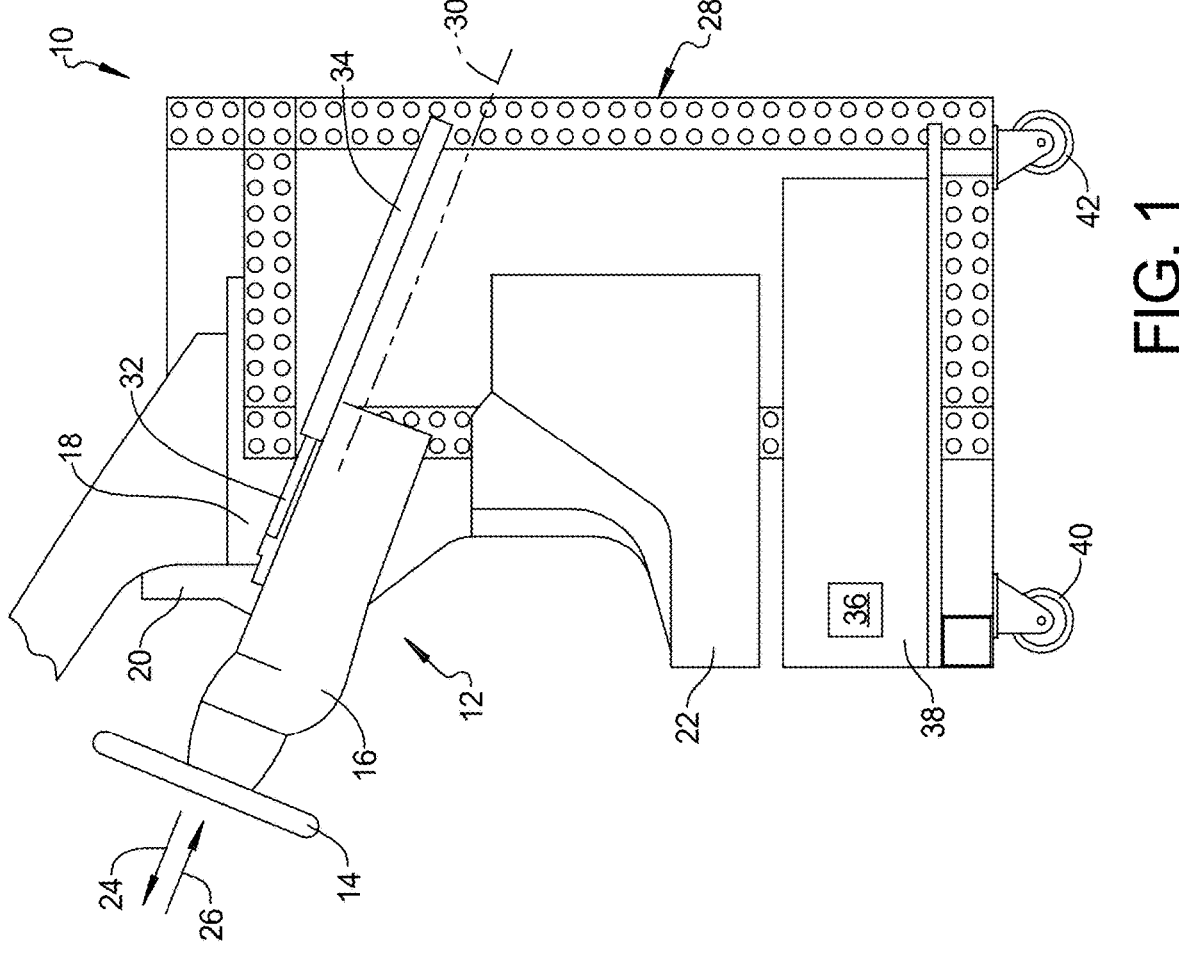

Referring to FIG. 1, a production steering column fixture 10 and system of the present disclosure integrates a bolt-on production steering column 12, a steering wheel 14, and a shroud 16 into a predetermined design car position supported on a steering component frame 18. The production steering column fixture 10 promotes visibility verification and modification of an instrument panel 20 as well as confirmation of visibility of the instrument panel 20 at any position of an occupant positioned in a seat member 22 mimicking a production vehicle seat, only partially shown for clarity in this view. The production steering column fixture 10 allows a same-range of motion for the steering column 12, the steering wheel 14 and the shroud 16 as a production vehicle 23. For example, the steering column 12 may be displaced by extending in a first outward direction 24 and retracted in an opposite second inward direction 26 and repeatedly and releasably fixed in any position within a range of motion of the components of the production steering column fixture 10.

The production steering column fixture 10 is supported by a fixture frame 28 which according to several aspects defines a metal such as aluminum including an aluminum fixture system such as Alufix® manufactured by the Witte Company, a subsidiary of Hirst Witte Geraetebau Company of Germany. The steering component frame 18 slides along a center line axis 30 of the steering column 12 directed by linear rails such as a first linear rail 32 in a sliding motion controlled by capture of the first linear rail 32 by a first rail channel 34. As described below in greater detail with respect to FIG. 2, the steering component frame 18 releasably mates to the fixture frame 28 of the production steering column fixture 10 with a same bolt hole pattern as provided with the fixture frame 28 allowing for installation and removal without cutting or modifying the fixture frame 28 or the steering component frame 18.

Figure 7:
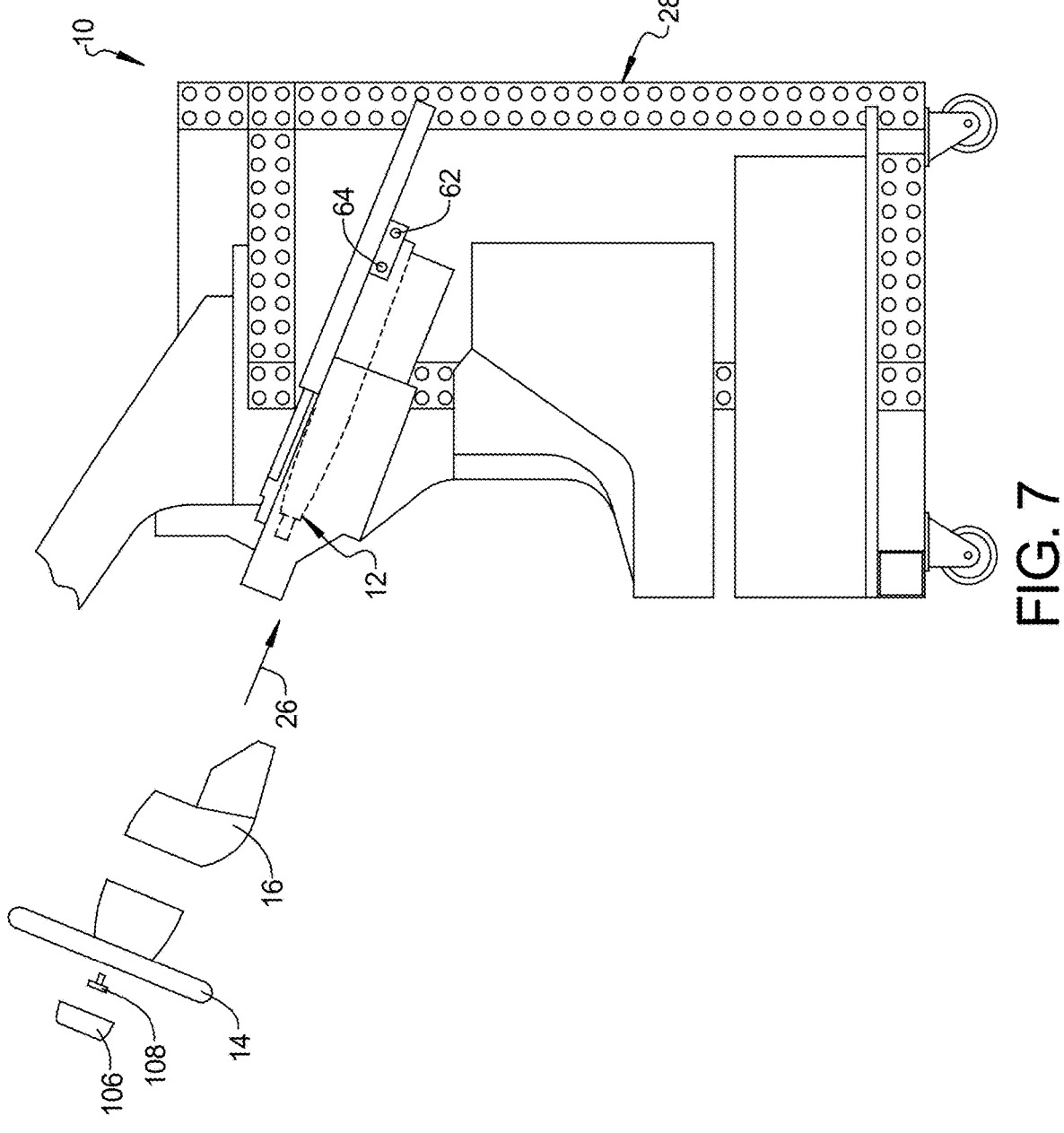
FIG. 7 is a right side elevational view of the production steering column fixture of FIG. 1.

As shown in FIG. 1, in a first releasably fixed condition a test position of the steering component frame 18 is provided. In a second releasably fixed condition shown in reference to FIG. 7, a stored position of the steering component frame 18 is provided. To provide power for testing the instrument panel 20 and displacing powered components such as the vehicle seat 22 and the steering wheel 14, a power source 36 such as a battery is locally provided in a support member 38 also attached to the fixture frame 28. To provide mobility for the production steering column fixture 10 multiple wheels 40, 42 are provided which are connected to the fixture frame 28.

Referring to FIG. 2 and again to FIG. 1, as noted above with respect to FIG. 1, the production steering column fixture 10 displaces along the center line axis 30 of the steering column 12 on linear rails such as the first linear rail 32 and a second linear rail 44 in a sliding motion controlled by capture of the linear rails such as the second linear rail 44 by a second rail channel 46. A portion of the fixture frame 28 includes a first mounting surface 48 opposed to a second mounting surface 50 which are mated to opposed inside facing first and second surfaces 52, 54 of a three dimensional, hereinafter designated as 3D, printed steering column mount 56 connected to the steering component frame 18. The 3D printed steering column mount 56 includes multiple apertures 60 which are individually axially aligned with individual ones of multiple through apertures 58 created in the portion of the fixture frame 28.

A first bolt 62 and a second bolt 64 extend through aligned ones of the apertures 60 of the 3D printed steering column mount 56 and the through apertures 58 of the portion of the fixture frame 28 to mount the production steering column fixture 10 to the portion of the fixture frame 28 with high precision. The shroud 16 may also be a 3D printed component and is attached to a steering column 66 with a key feature as described in reference to FIGS. 3 and 4 to ensure correct positioning and clocking of the shroud 16 and the steering wheel 14. The steering wheel 14 may be 3D printed and uses a production spline for engagement and correct design position to the aluminum Alufix® fixture frame 28. A designated occupant such as a clay modeler or a simulated vehicle operator sitting in the vehicle seat 22 can adjust the vehicle seat 22 and the steering wheel 14 on the steering column 66 manually or by using power, if provided, through a full range of vehicle seat 22 and steering wheel 14 travel. This adjustment allows for physical confirmation of acceptable positioning of the instrument panel 20 shown in FIG. 1 and to confirm occupant line-of-sight to individual gauges of the instrument panel 20 and if any hand obstruction is present.

Figure 2:
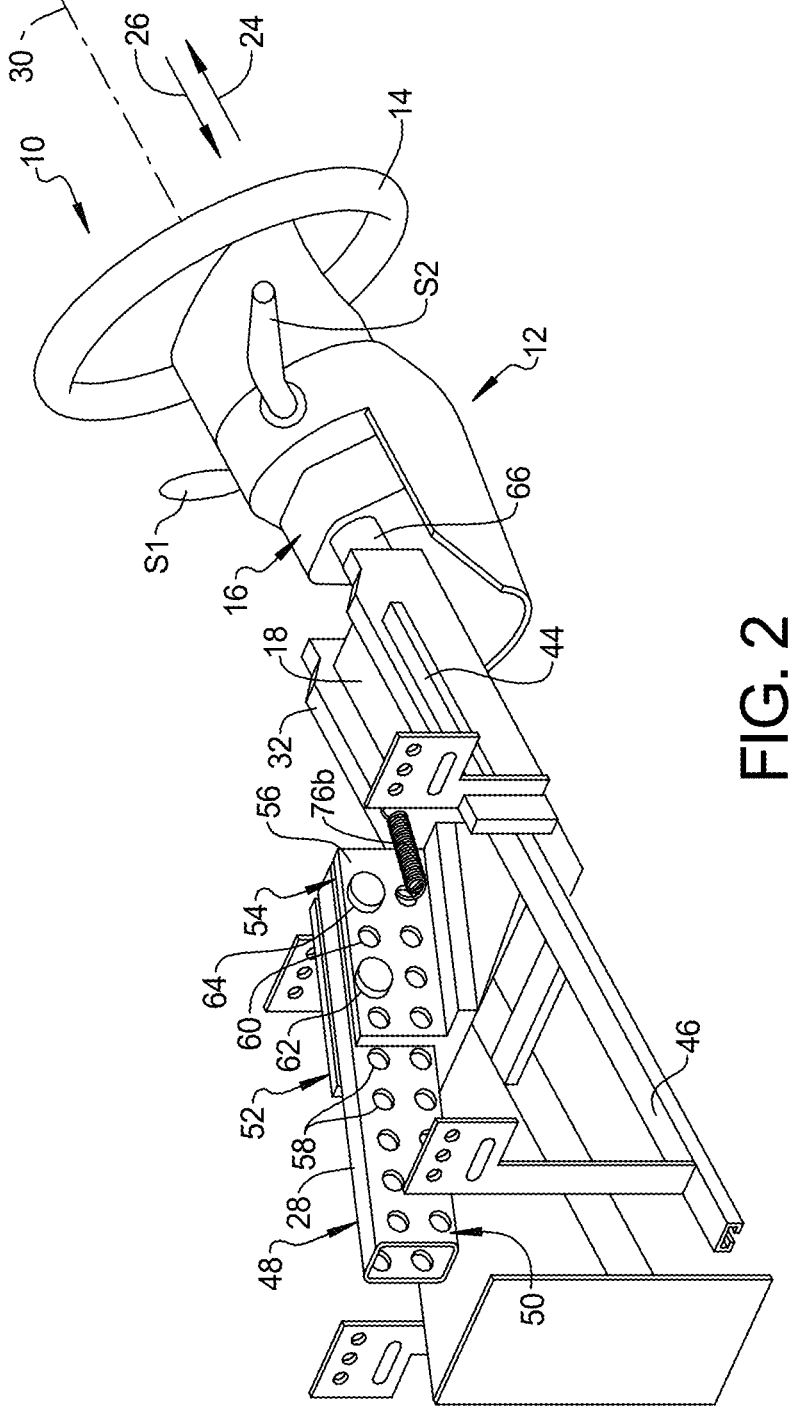
FIG. 2 is a front left perspective view of a vehicle steering system adapted to use in the production steering column fixture of FIG. 1.

Referring to FIG. 3 and again to FIGS. 1 and 2, a keyway 68 is created in the steering column 66 such as by machining or forming. A telescoping switch 70 may also be provided with the shroud 16 to electronically control positioning of the steering wheel 14, similar to the production vehicle design.

Figures 3, 4:
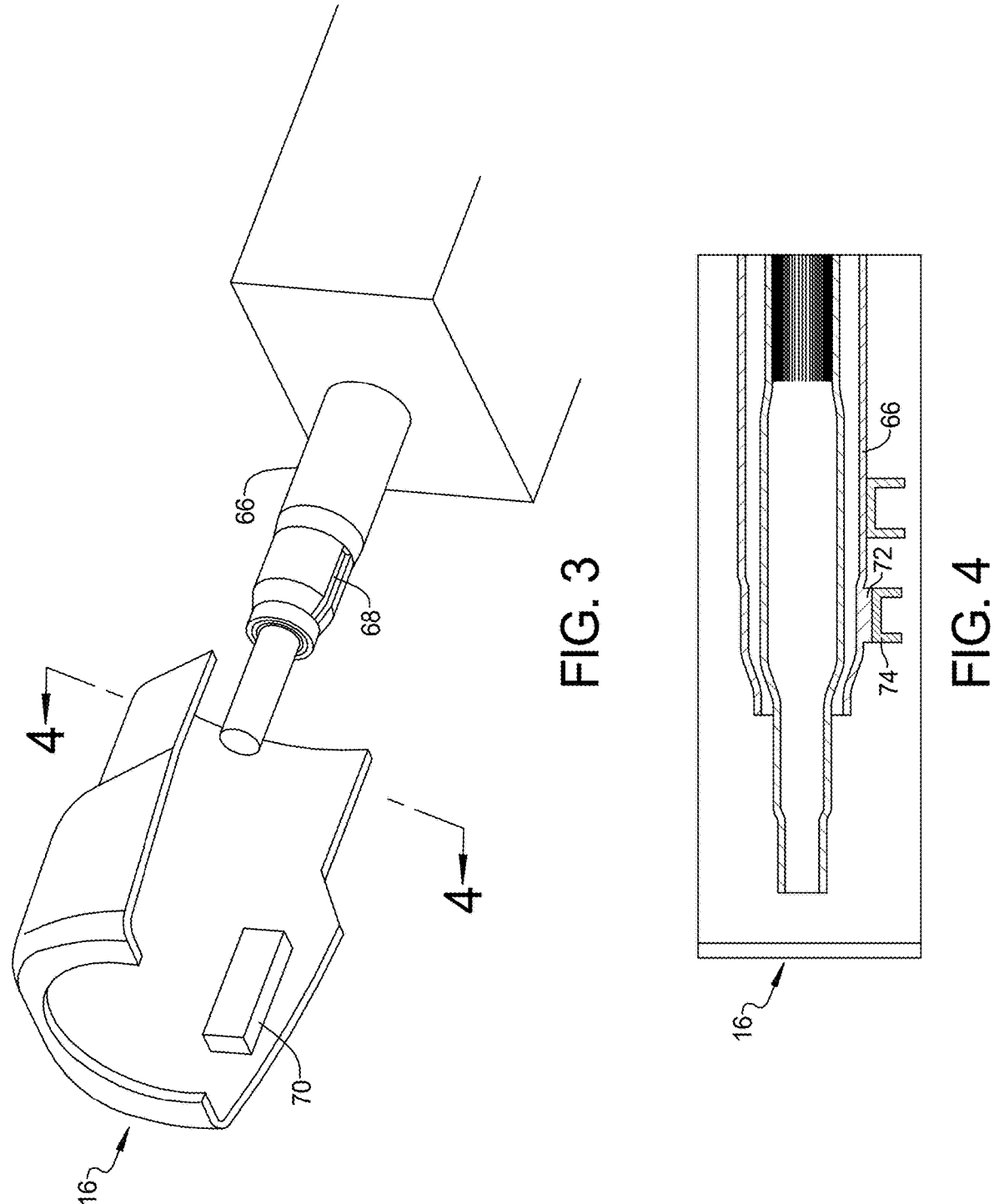
FIG. 3 is a partial sectional front left perspective view of the vehicle steering system of FIG. 2.
FIG. 4 is a right side partial cross sectional perspective view taken at section 4 of FIG. 3.

Referring to FIG. 4 and again to FIGS. 1 through 3, a tab or key 72 is connected to a structural member 74 of the shroud 16. The key 72 is slidably received in the keyway 68 described above with respect to FIG. 3 to provide a correct design position and clocking of the shroud 16, a turn signal stalk S1 and a control stalk S2 shown in reference to FIG. 2 and a camera (not shown).

Referring to FIG. 5 and again to FIGS. 1 through 4, a first biasing member 76a such as a tension spring or a gas strut is attached to a frame 78 of the 3D printed steering column mount 56 with a metal mount 80 and oppositely connected to a tab 82 extending from the steering component frame 18. A second biasing member 76b similar to first biasing member 76a is shown in reference to FIG. 2. The first biasing member 76a and the second biasing member 76b control a rate of descent of the production steering column fixture 10 during displacement between the test position of the steering component frame 18 to the stored position to mitigate against a pinch condition for operators and clay modelers. The displacement of the production steering column fixture 10 using the first biasing member 76a and the second biasing member 76b also permits the clay modelers to displace the production steering column fixture 10 between the test and stored positions daily.

Figure 5:
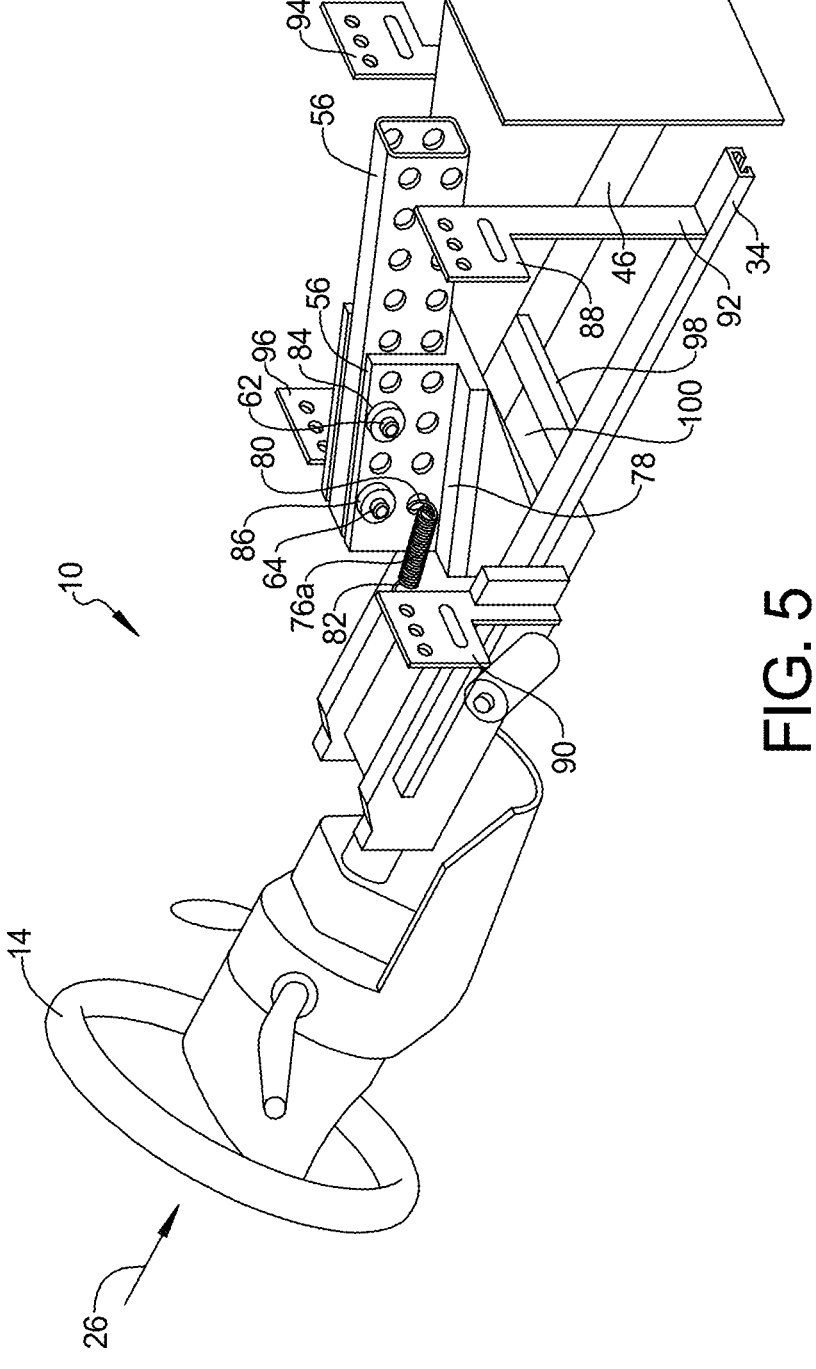
FIG. 5 is a front right perspective view of the vehicle steering system of FIG. 2.

With continuing reference to FIG. 5, the first bolt 62 may be releasably fixed to the 3D printed steering column mount 56 using a first nut 84 and the second bolt 64 may be similarly releasably fixed using a second nut 86. A first mounting bracket 88 and a second mounting bracket 90 are adapted to be fastenably and releasably fixed to the fixture frame 28 and are fixed to the first rail channel 34, for example using a connecting arm 92. Similarly, a third mounting bracket 94 and a fourth mounting bracket 96 adapted to be fastenably and releasably fixed to the fixture frame 28 are fixed to the second rail channel 46. An aperture created in a plate 98 connected to the first rail channel 34 and the second rail channel 46 defines a pull handle 100 used to manually retract the production steering column fixture 10 into the fixture frame 28, which elastically extends the biasing members such as the first biasing member 76a and the second biasing member 76b.

Figure 6:
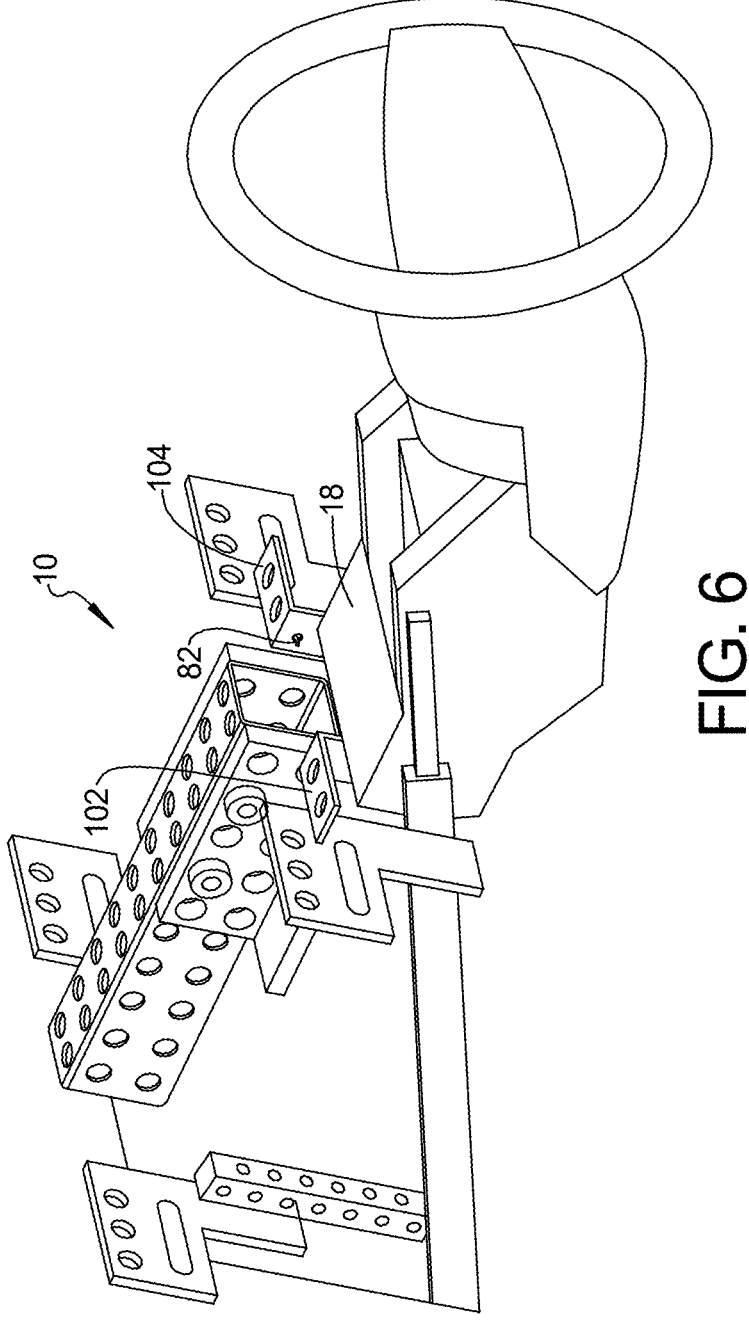
FIG. 6 is a rear left perspective view of the vehicle steering system of FIG. 2.

Referring to FIG. 6 and again to FIGS. 1 through 5, a first support mount 102 and a second support mount 104 are fixedly connected to the steering component frame 18. A free end of individual ones of the first and second biasing elements 76a, 76b are connected to one of the first support mount 102 and the second support mount 104 respectively.

The bolts 62, 64 or similarly configured pins releasably lock the production steering column fixture 10 and the steering column 66 along with the steering column shroud 16 and the steering wheel 14 in a design car position defining the test position. When not being displayed for test purposes, and to permit machining or modification of the instrument panel 20, the steering wheel 14 and the shroud 16 can be removed and the steering column 66 after removal of the bolts 62, 64 or pins can displace along the centerline axis 30 of the steering column 66 by the clay modelers generally downward along the centerline axis 30 by pulling on the handle 100. The production steering column fixture 10 can be pinned in a storage location positioned inside the fixture frame 28 such as an Alufix® frame, allowing for unobstructed access to the clay instrument panel 20 for access by clay modelers as well as access for a milling machine to access the clay instrument panel 20.

Referring to FIG. 7 and again to FIG. 1, a second releasably fixed condition, a stored position of the steering component frame 18 is provided using the component removal and displacement sequence described below. In the stored position, the steering wheel 16, the shroud 16 and the bolts 62, 64 have been removed. Manual pressure is applied to pull the handle 100 and thereby the production steering column fixture 10 downward I the second inward direction 26, extending and thereby biasing the biasing elements 76a, 76b, until the steering component frame 18 is predominantly positioned within a spatial envelope of the fixture frame 28. Access is provided in the releasably fixed position for a milling machine to access the instrument panel 20 for clay material machining necessary to correct out-of-position instruments on the instrument panel 20 used for further visual confirmation of acceptable instrument positioning.

With continuing reference to FIG. 7 and again to FIGS. 1, 2 and 5, a removal sequence for components of the production steering column fixture 10 to change between the test position and the second releasably fixed position or machining position of the production steering column fixture 10 is as follows: 1) Remove a 3D printed horn/airbag cover 106 from the steering wheel 14; 2) Remove a screw 108 releasably retaining the key 72; 3) Remove the steering wheel 14; 4) Remove the shroud 16 (including an electrical switch if steering wheel displacement is provided); 5) Remove the bolts 62, 64; 6) Apply manual pressure to pull the handle 100 and thereby the production steering column 12 of the production steering column fixture 10 downward, extending and thereby biasing the biasing elements 76a, 76b; 7) Releasably pin remaining components in the lowered and retracted position of the production steering column 12 shown by reinsertion of the bolts 62, 64 at predetermined fixture frame 28 aperture locations.

The production steering column fixture 10 of the present disclosure offers several advantages. These include: the production steering column 12 mechanically replicates actual production displacement through a full range of motion of the steering column 66, either powered or manual. This permits viewing the instrument panel 20 over a full motion range of the vehicle seat 22 and the steering wheel 14, providing line-of-sight to the instrument panel 20 for verification of instrument visibility. Because the clay material of the instrument panel 20 requires access for milling machines and for access by clay modelers, the production steering column 12 can retract inside the fixture frame 28 and out of the way of the milling machines by removal of a pin, and releasably lock in-place.

The production steering column fixture 10 holds a production steering column 12 in an instrument panel clay material armature seating buck. The production steering column fixture 10 may be used for example in a design studio for visual evaluation of an instrument panel 20, to allow for real-world and actual displacement of the steering wheel 14 via electric power or manual adjustment. When not displaced in the production car also defined as the test position, the steering wheel 14 and the shroud 16 can be removed, and the production steering column 12 can retract out of the way and be stored inside the fixture frame 28. The production steering column fixture 10 utilizes production parts including the production steering column 12 and mounts to an existing clay armature fixture with use of 3d printed brackets and machined parts. The production steering column fixture 10 may be stored when not in use and is mobile through wheels provided with the fixture frame 28.

What is claimed is:

1. A production steering column fixture, comprising:
a production steering column;
a steering wheel;
a shroud;
a steering component frame receiving the production steering column, the steering wheel and the shroud in a predetermined design car position of a vehicle;
an instrument panel positioned proximate to the steering component frame and configured to be visible by an occupant at any position of the steering wheel;
a fixture frame wherein the fixture frame defines a metal including aluminum further defining an aluminum fixture system receiving the steering component frame, the production steering column, the steering wheel and the shroud; and
a 3D printed steering column mount, wherein a first mounting surface of the steering component frame and an opposed second mounting surface of the steering component frame are mated to opposed inside facing first and second surfaces of the 3D printed steering column mount.

2. The production steering column fixture of claim 1, further including:
multiple through apertures created in the 3D printed steering column mount are individually axially aligned with individual ones of multiple apertures of the steering component frame; and
a first bolt and a second bolt extended through aligned ones of the multiple through apertures created in the 3D printed steering column mount and the multiple apertures of the steering component frame to releasably mount the production steering column fixture to the steering component frame.

3. The production steering column fixture of claim 1, further including:
a first linear rail and a second linear rail connected to the steering component frame; and
a first rail channel and a second rail channel connected to a fixture frame; and
wherein the steering component frame slides parallel to a center line axis of the steering column in a linear motion controlled by sliding capture of the first linear rail within the first rail channel and the second linear rail within the second rail channel.

4. The production steering column fixture of claim 3 including at least one biasing member attached to a frame of a 3D printed steering column mount connected to the fixture frame and oppositely connected to a tab extending from the steering component frame.

5. The production steering column fixture of claim 4 wherein the at least one biasing member includes:
a first biasing member attached to a first frame member of the 3D printed steering column mount with a first metal mount and oppositely connected to a first tab extending from the steering component frame; and a second biasing member attached to a second frame member of the 3D printed steering column mount with a second metal mount and oppositely connected to a second tab extending from the steering component frame.

6. The production steering column fixture of claim 1, wherein the instrument panel defines a clay material adapted for on-site milling to modify the instrument panel.

7. The production steering column fixture of claim 1, wherein the steering wheel and the shroud individually define a 3D printed component.

8. The production steering column fixture of claim 1, further including:
a keyway created in the steering column; and
key connected to a structural member of the shroud, the key slidably received in the keyway to provide a predetermined design position and clocking of the shroud.

9. A production steering column fixture, comprising:
a production steering column of a vehicle;
a steering component frame receiving the production steering column in individual ones of a predetermined test position and a stored position;
a vehicle seat removably connected to the steering component frame; and
an instrument panel of a clay material positioned proximate to the steering component frame, wherein the instrument panel is configured to be visible by an occupant seated on the vehicle seat at different displaced positions of the vehicle seat.

10. The production steering column fixture of claim 9, including:
a linear rail connected to the steering component frame; and
a rail channel connected to a fixture frame, wherein the steering component frame slides parallel to a center line axis of the steering column in a linear motion controlled by sliding capture of the linear rail within the rail channel.

11. The production steering column fixture of claim 10, including a pull handle including an aperture created in a plate connected to the rail channel used to manually retract the steering component frame into the fixture frame.

12. The production steering column fixture of claim 10, including a biasing member attached to a frame of a 3D printed steering column mount connected to the fixture frame, the biasing member controlling a rate of descent of the production steering column during displacement between an extended test position of the production steering column to a stored position having the production steering column retracted into the steering component frame.

13. The production steering column fixture of claim 12, including multiple through apertures created in the 3D printed steering column mount individually axially aligned with individual ones of multiple apertures of the steering component frame.

14. The production steering column fixture of claim 13, including at least one bolt extended through aligned ones of the multiple through apertures created in the 3D printed steering column mount and the multiple apertures of the steering component frame to releasably mount the production steering column fixture to the steering component frame.

15. The production steering column fixture of claim 9, including:
a steering wheel connected to the production steering column wherein the occupant seated on the vehicle seat further confirms visibility of the instrument panel at different displaced positions of the steering wheel; and a shroud connected to the production steering column.

16. A method for operating a production steering column fixture, comprising:

assembling a production steering column, a steering wheel, and a shroud in a test position of a production assembly of a vehicle;

mounting the production assembly on a steering component frame having a 3D printed steering column mount;

individually axially aligning multiple through apertures created in the 3D printed steering column mount with individual ones of multiple apertures of the steering component frame; and extending a first bolt and a second bolt through the individually axially aligned multiple through apertures of the 3D printed steering column mount and the individual ones of the multiple apertures of the steering component frame;

connecting the steering component frame to a fixture frame defining an aluminum fixture system;

positioning an instrument panel of a clay material mimicking a production vehicle instrument panel proximate to the steering component frame; and confirming visibility of the clay instrument panel at any displaced position of the steering wheel.

17. The method of claim 16, further including;

removing the first bolt and the second bolt; and moving the production assembly from the test position to a stored position.

18. The method of claim 17, further including machining the instrument panel in the stored position to modify the instrument panel.

\* \* \* \* \*